(12) United States Patent
Padgett

(10) Patent No.: US 6,474,267 B1
(45) Date of Patent: Nov. 5, 2002

(54) PELLETIZED ANIMAL BEDDING AND PROCESS AND TOOL FOR SIFTING MANURE THEREFROM

(76) Inventor: Danny L. Padgett, 3815 Tipp-Cowlesville Rd., Tipp City, OH (US) 45371

( * ) Notice: Subject to any disclaimer, the term of this patent is extended or adjusted under 35 U.S.C. 154(b) by 0 days.

(21) Appl. No.: 09/924,805

(22) Filed: Aug. 9, 2001

(51) Int. Cl.[7] .............................................. A01K 1/015
(52) U.S. Cl. ......................... 119/526; 119/171; 294/50
(58) Field of Search ............................ 294/59; 119/172, 119/526, 171; 442/388

(56) References Cited

U.S. PATENT DOCUMENTS

| | | | | |
|---|---|---|---|---|
| 5,209,186 A | * | 5/1993 | Dewing | 119/172 |
| 5,417,044 A | | 5/1995 | Russo | |
| 5,429,073 A | * | 7/1995 | Ballard | 119/171 |
| 5,799,998 A | * | 9/1998 | Gitterman, III | 294/59 |
| D406,413 S | | 3/1999 | Russo | |
| 5,878,696 A | * | 3/1999 | Gerling et al. | 119/526 |
| 6,058,883 A | * | 5/2000 | Robins | 119/171 |

OTHER PUBLICATIONS

Horse Stalls, Woody Pet Products, Inc., Mar. 10, 2002.*
New User Instructions, Woody Pet Products, Inc., Mar. 10, 2002.*
Products: Fine Tines Fork, Woody Pet Produts, Inc., Mar. 10, 2002.*

* cited by examiner

*Primary Examiner*—Charles T. Jordan
*Assistant Examiner*—Bret Hayes
(74) *Attorney, Agent, or Firm*—William Weigl

(57) ABSTRACT

Animal manure is removed from a bedding material consisting of compacted and compressed pelletized sawdust particles or granules of relatively uniform size by a pellet fork specifically designed to enable the pellets or particles to sift through the tines of the fork while retaining all but the tiniest particles of manure atop the tines for disposal. The pellet fork is uniquely and specifically designed to provide an improved sifting function not previously possible with other bedding materials except when using a mechanized sifter, resulting in substantial material and labor cost savings, longer life and easier maintenance of bedding, reduction of cleaning time per stall, improved cleanliness of stalls and attendant improved health of the animals. The volume of waste and bedding removed from a horse stall during cleaning may reduce a manure pile as much as 70% compared to conventional use of straw.

15 Claims, 3 Drawing Sheets

PELLETIZED ANIMAL BEDDING AND PROCESS AND TOOL FOR SIFTING MANURE THEREFROM

This invention relates to a process and device for providing a long-lasting, easy-to-maintain, reduced-cost bedding for animals which are kept in stalls, through use of a sterile particulate pelletized sawdust bedding in conjunction with a novel tool for performing the sifting of manure droppings and urine-clumped material from the bedding. In its preferred form, the invention provides a converted pelletized material that provides safer footing for animals than pellets that have recently been introduced in this field.

BACKGROUND OF THE INVENTION

For a considerable period of time, livestock animals that are normally confined in stalls or pens have been provided with bedding material of natural straw. Such stalls, whether using straw bedding or newer materials which have come into use during the last 15–20 years, naturally require frequent removal of manure not only for the health and birthing of the animals, but also to reduce noxious odors and piles of manure associated with animal husbandry.

A major problem associated with straw is that when using it as bedding for horses for example, when cleaning a stall, manure and straw are picked up together with a pitchfork having wide spaces between the tines. The fork must enter the straw beneath the droppings, and whatever straw is also picked up is disposed of along with the manure. Both the manure and the straw are placed in a wheelbarrow and transported to a manure pile. Although care is taken to remove as little of the straw as possible, much is lost during manure removal. Periodically, the manure pile must be disposed of, either by being sold or given away for use as fertilizer, or by being buried as landfill. The higher the percentage of straw that is present in the manure pile, the less desirable and valuable it becomes as fertilizer. Composting time is also a problem. Together, these factors require some manure to become landfill. Landfill burial is of major concern to the Environmental Protection Agency of the United States Government. As a result, efforts are being made nationwide to reduce or eliminate use of straw as horse bedding.

When raising or keeping horses, depending on the type of horse being kept or raised, the bedding may be completely stripped daily or weekly, the former typically being the normal schedule for valuable thoroughbred horses and the latter being that maintained for general equines. Thusly, the cost and storage of straw, the extent to which it is lost in stall cleaning and the size of manure piles and their disposal are problems faced by all in the field.

During the past few decades, two additional types of bedding have come into fairly regular use. One common type is pine or cedar wood shavings or chips, the other being sawdust. Each has its advantages and disadvantages in comparison to straw and to each other. Since shavings and sawdust are small or fine in comparison to the long strands of straw, some sifting can take place during manure removal, resulting in considerably less of the bedding material being thrown out with the manure. However, since the normal tine spacing of typical forks used to remove the manure is between nine-sixteenths of an inch and one inch, much of the manure that has dried somewhat and been trampled by the horse moving around in the stall is also sifted through the fork and remains with the shavings or sawdust bedding after the stall has been cleaned. For obvious reasons of cost and cleanliness, it is undesirable to let manure particles smaller than one inch or a half-inch remain in the stall after a maintenance cleaning, and be removed only at such time as the stall is completely stripped. While sawdust can easily sift through the tines and return to the bedding, shavings, if of a length greater than the tine spacing and lying crosswise of the tines, will be thrown out with the manure and somewhat reduce the bedding volume at each stall cleaning. Like straw, a bed of shavings must be completely stripped at least weekly and a new bed started with fresh material. Wood shavings typically have aromatic hydrocarbons that can be detrimental to a horse's health, particularly its respiratory system. Further, shavings are subject to bacterial growth and retention of the noxious ammonia odor of urine as well as that of manure. Resins and natural oils from the shavings may prevent the manure from being used for fertilizer unless composted for a considerable period. If manure that is not properly composted is spread on a field too early, lime must frequently be spread over the manure to sweeten the soil, further adding to overall cost.

A typical problem with sawdust bedding is the inconsistency in size of the particles, its normally large moisture content which may be as little as 16% but as much as 90% and the amount of long splinters frequently found in sawdust bedding. Splinters may be more than two to four inches in length. The finer particles of sawdust, if they dry out in low humidity areas, can cause respiratory problems, referred to in the horse raising industry as the "heaves". Except for the splinters, sawdust sifting can ordinarily be accomplished easily, leaving a fair percentage of the bedding behind during stall cleaning. But with existing manure forks, a high percentage of small, trampled manure particles are also left behind after cleaning a stall, resulting in a degraded bedding that may be required to be stripped more frequently for a high quality horse. The coat of some horses can even be stained or discolored by manure particles left behind. Sawdust is also subjected to the same detrimental oil or resin aspects of wood shavings with respect to the required length of time it takes to compost manure before it can be used as fertilizer.

Shavings and sawdust use results in a considerable reduction in the size of manure piles as compared to straw. But the increase of composting time of these wood products collected with manure makes their use as fertilizer less attractive. This can result in a higher percentage of manure that is contaminated with shavings and sawdust being directed to landfill disposal.

To a much lesser extent, other bedding materials have been tried with varying degrees of success. Peanut shells and grasses are but a few examples.

A few years ago, there was introduced to the horse husbandry trade in Canada a fourth type of bedding. A distributor of a cat litter material that was made from sawdust compressed into quarter-inch diameter hardened cylindrical pellets initiated use of the product for horse bedding. It was sold in 30# bags at around $6–$7 U.S. per bag and is achieving ever-increasing success. As these hardened pellets acquire moisture, they fluff up perhaps four times in volume into granulated sawdust. In cooperation with the Canadian distributor, I began experimentation with the pellets for the U.S. market. Friends and acquaintances who saw, heard or were told what I was doing greeted my efforts with considerable skepticism. They were aware that the pelletized sawdust material was considerably more expensive than other bedding materials used in the trade at the time. And although I realized that the pellets were sterilized during their processing by having pine tar resins and oils removed, I did not fully appreciate the advantageous labor and material savings implications of the sterile condition of the material. The sawdust is said by the distributor to, be dried for thirty minutes at 800° F. and then cooled to 145° F. It is then subjected to approximately 20–30,000 pounds pressure per square inch during extrusion into the quarter-inch diameter pellets, increasing the temperature back to 200° F. until the pellets produced finally cool to ambient temperature. Resulting pellets are about one-half inch in length. The end product has been sold for horse bedding by Woody Pet Products, Inc., of 15061 Marine Drive, White Rock, British Columbia, Canada for the last few years. When Woody Pet began commercializing the cat litter as horse bedding, and to this day to the best of my knowledge, the only relatively satisfactory means of cleaning smaller pieces of trampled manure from the bedding was to use a relatively expensive motorized electrical vibrating sifter directly in the stall. Such a sifter is sold by the previously-mentioned Woody Pet Products under the common law trademark THE GREEN MACHINE. In order to use this sifter, not only must the sifter be manually moved on wheels from stall to stall, but the horse must be moved out of a stall beforehand, secured elsewhere and returned to the stall after cleaning and removal of the sifter. These operations require time and labor cost. If a horse is the least bit skittish, it likely cannot tolerate being around a noisy vibrator. Furthermore, use of the vibrator was subject to the usual difficulties associated with long electrical extension cords and the location and availability of electrical outlets. A motorized vibrator also has a tendency to reduce dried manure into smaller pieces, causing such smaller pieces to pass through the sifting screen. This returns excessive manure that would otherwise be removed back to the bedding, causing unwanted bedding degradation. Not only is the vibrating sifter relatively costly, but its size, weight and lost time associated with its use appears to have limited its effectiveness in the trade.

There is also a manual tool commonly referred to as a scoop shovel that is capable of sifting small manure particles from sawdust, but it is difficult to use because it has a blunt shovel-type edge instead of tines. Without tines, it cannot freely enter the sawdust beneath manure. The scoop shovel has small diamond-shaped sifting openings over its entire bottom surface, much like common expanded metal. It is believed to be of very little benefit in cleaning stalls because of the difficulty of using the shovel to freely enter and pick up both sawdust and manure.

U.S. Design Pat. No. 406,413 granted to Anthony N. Russo on Mar. 2, 1999 for a Horse Mucking Rake and the same inventor's utility U.S. Pat. No. 5,417,044 issued May 23, 1995 are used with wood chip bedding according to the disclosure of the latter. As such, their tine spacing if used with pelletized bedding will permit a substantial amount of manure particles to pass through the tines. This tends to degrade the bedding prematurely both in discoloration and potential increase of retained bacteria.

Another problem I have discovered in connection with using the pellets as sold by Woody Pet it that they are what I call being "rolly" underfoot. The half-inch long hardened pellets tend to act like roller bearings while still in solid form, i.e., before absorbing moisture and fluffing into sawdust. This can result in an unsure footing and possible injury to the horse or to a person in the stall. A fresh bed of the half-inch pellets has the potential of being uncomfortable to a horse.

The problems of being able to clean the pelletized bedding to the greatest degree possible without scaring the horse through use of a vibrator, and of reducing the rolliness of the product while still in the hard cylindrical stage remained unsolved by the prior art.

SUMMARY OF THE INVENTION

Animal manure is removed from a bedding material consisting of compacted and compressed pelletized sawdust particles or granules of preferably a relatively uniform size by a pellet fork specifically designed to enable the pellets or particles to sift through the tines of the fork while retaining all but the tiniest particles of manure atop the tines for disposal. The pellet fork is uniquely and specifically designed to provide an improved sifting function not previously possible with other bedding materials except when using a mechanized sifter, resulting in substantial material and labor cost savings, longer life and easier maintenance of bedding, reduction of cleaning time per stall, improved cleanliness of stalls and attendant improved health of the animals. The volume of waste and bedding removed from a horse stall during cleaning may be reduced as much as 70% compared to conventional use of straw.

It is a principal object of the invention to provide for comparatively low cost maintenance of livestock bedding while resulting in a cleaner, healthier stall and animal, by removing an increased percentage of manure and a reduced volume of bedding material at each stall cleaning.

An ancillary object is to improve the environment by reducing the size of manure piles, therefore reducing the volume of waste going into landfill.

Another object is to provide a unique bedding material for such livestock, and to provide a novel tool for enabling cleaning the stall in a shorter time period than heretofore with other known bedding materials.

A further object is to reduce labor cost in cleaning manure from a horse stall by using a manual tool which allows the horse to remain in its stall during cleaning.

A specific object is to provide a novel pelletized horse bedding and pellet fork, which, when used in conjunction with each other, result in a cleaner bedding that can be maintained in that condition for longer periods than heretofore-known horse beddings.

A further object is to provide compressed pelletized animal bedding that assures a more secure footing for an animal while the pellets are still in a hardened condition.

A related object is to use a pellet fork with uniform-size compacted sawdust pellet particles, which fork has tine spacing slightly exceeding the particle size, thus resulting in minimum removal of pellets with animal manure when cleaning stalls.

Another object is to effectively remove manure when cleaning a stall, reducing the volume of a manure pile by as much as 70% compared to straw. Related to this object is the advantage of using only a hand-carried pail rather than a wheelbarrow to remove manure from a stall.

Still another object is to provide pelletized material that is capable of fluffing into sawdust more rapidly than existing similar product when exposed to liquid contact.

Another object is to substantially reduce the cost of pelletized animal bedding by removing a higher percentage of manure than any existing fork known, thus extending bedding life.

Other objects will become apparent from the following description, in which reference is made to the accompanying drawings.

DESCRIPTION OF THE PREFERRED EMBODIMENT

Although it will be readily recognized that the concepts disclosed herein can be useful in conjunction with many different kinds of livestock kept in stalls, it will be described for use in horse husbandry, the area of my livelihood.

Figure 1:
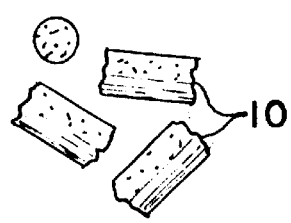
FIG. 1 is a depiction of a group of cylindrical hardened sawdust pellets that can be purchased in bags for use in cat litter boxes or as horse bedding.

Referring now to FIG. 1, there exists at this time a horse bedding consisting of hardened compacted cylindrical relatively dry pellets 10 produced for and distributed by Woody Pet Products, Inc., of 15061 Marine Drive, White Rock, British Columbia, Canada. Their moisture content is typically in the neighborhood of 5%. The pellets are made from sawdust that has most resins and natural oils removed therefrom. They are compacted into pellet form under high temperature and pressure, and are extruded to one-fourth inch diameter and approximately one-half of an inch in length. They can be said to resemble roller bearings, each being relatively free to roll with respect to a flat surface or move with respect to others when in a pile. These pellets, when subjected to the influence of moisture, can swell about three to four times in volume as they fluff into sawdust granules.

Figure 2:
FIG. 2 shows the identical base material as in FIG. 1 after having been reduced in size by crushing and thereby converting the pellets into non-cylindrical, somewhat interlockingly-shaped particles.
Figure 3:
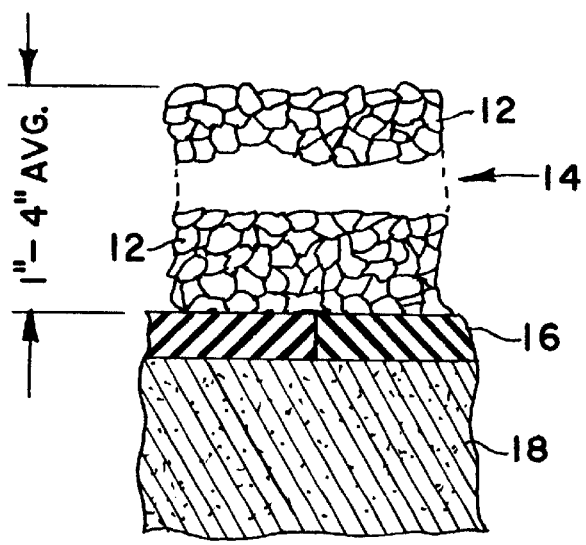
FIG. 3 is a typical cross-sectional view of horse bedding made of the particulate material of FIG. 2.

FIG. 2 illustrates my preferred conversion or modification of the pellets 10 into interlocking granules or particles 12, some of which can be seen to retain a partially cylindrical shape like the pellets of FIG. 1. They are converted in any suitable manner until they reduce in size to where the maximum particle size is approximately one-fourth of an inch. The conversion from the cylindrical shape of FIG. 1 provides surer footing for the horse when the pellets are still in hardened form, both by eliminating the roller bearing "rolliness" and by causing the particles 12 to pack more readily than is possible for roller bearings. The term "pelletized" as used herein is intended to cover the shapes of both pellets 10 and particles 12. The advantage of the particles 12, as will become apparent later, lasts primarily for only a little while, when a bedding 14 shown in FIG. 3 is initially established or when additional particles 12 are added periodically to maintain the bedding. This is so because absorption of moisture from horse urine (or water that may be sprinkled on the bedding 14 when it is established) causes the particles to fluff up into slightly moistened sawdust. Once so reduced, the negative affect of rolliness disappears, except as additional pellet particles 12 are occasionally added to an existing bedding. Even then, they are spread around the bedding and intermixed with existing sawdust in a manner that makes for ease of the horse walking about the bedding with surer footing. Particles 12, by being crushed or otherwise reduced in size from pellet 10 form, absorb liquid more rapidly. The conversion fractures them lengthwise as well as crosswise, exposing more of the softer inner surfaces of the particles 12 to ease absorption.

FIG. 3 is a vertical cross-sectional view of the bedding 14, which preferably is originally prepared at a depth of between one and four inches. For a 10' by 12' stall, four 30# bags of pellet particles 12 are placed on edge-abutting rubber mats 16 which rest on bare earth 18. As the horse passes manure or urine, the solids stay on the top of the particles or sawdust while the liquid is absorbed into the particles and causes them to fluff and become sawdust. This is contrasted with generally non-absorbent straw, where the urine passes through the straw, puddles on the earth (unless rubber mats are provided) and creates a strong ammonia odor which permeates the barn. Naturally, as the horse moves about the stall between passing the manure droppings and their being removed, the manure may be trampled and break into smaller pieces. Unfortunately, if such smaller pieces are less than the one inch or nine-sixteenths of an inch spacing between the tines of standard manure forks, they will likely remain behind when the standard fork is used to attempt removal of the manure. This is obviously detrimental to all aspects of the trade, the attendant odors, and the attraction of flies as well as potential health problems for the horse.

When substantial urine is localized, as is often the case, the fluffed sawdust will clump and tend to partially solidify. This makes for easy removal of clumps as well as manure at the next cleaning. As clumped sawdust is removed, a light sprinkling of fresh particles 12 can be removed from a bag and added in its place. Ideally, the fresh particles are intermixed with previous sawdust or particles so as to distribute any moisture fairly evenly.

Figure 4:
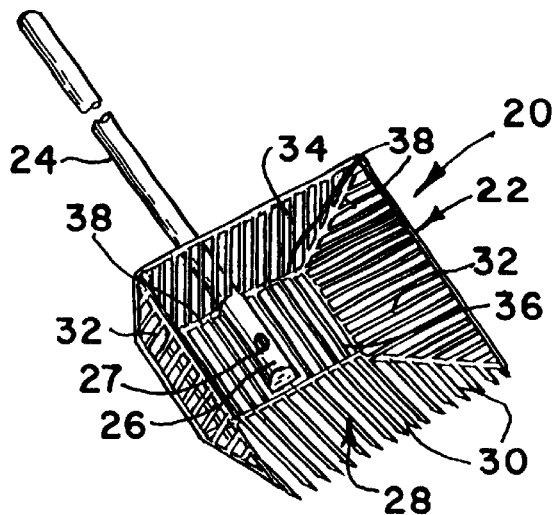
FIG. 4 is an isometric view of the fork for handling the cleaning of manure from the bedding of FIG. 3.

Much to my surprise and delight, I have found that the sterile pellet particles 12 and pellets 10 have practically no odor, not even when used for several months, with a maintenance program as described above. Normally, subject to many variables, one additional 30# bag may be added at the end of the second week of use, followed by a bag per week thereafter. It is the advantage of the long continued use of material which has been merely maintained, rather than being completely and frequently stripped from the stall, that provides a major cost advantage of pelletized sawdust over other bedding materials. But, unfortunately when using standard manure forks, too many small pieces of manure remain behind in the bedding and cause it to degrade and discolor. To avoid having to use the only presently-known motorized sifter and subject myself to the added labor of moving the horse as well as the mechanized sifting machine as each daily cleaning is to be commenced, I have solved the problem by producing the novel, manually-manipulated manure fork shown by the numeral 20 in FIG. 4.

The fork 20 includes a head 22 and a handle 24 inserted into a cavity of a cylindrical portion 26 and secured thereto by a bolt 27. The head is preferably a molded polycarbonate material formed in a single cavity injection mold to achieve the strength, and breakage and wear resistance for which polycarbonate plastic is well known. The head has a tine portion 28 that enters into bedding beneath manure, with tines 30 projecting outwardly in cantilevered fashion from an open end of the head 22. The head 22 illustrated is essentially bucket-shaped and is eighteen inches in width. It has thirty tines 30 as compared to a standard manure fork that has only eighteen tines spanning a fork width of fourteen inches. The head 22 further includes a pair of opposed side walls 32, a rear wall 34 and a bottom wall 36. At the junctures of the bottom wall 36 with the side walls 32, rear wall 34 and tine portion 28, strengthening ribs 38 are formed. Similar strengthening ribs connect the adjoining edges of the side walls 32 with the rear wall 34 and the tine portion 28, as well as extend around the periphery of the head 22 except at the tips of the tines. The tines 30 extend rightwardly from the strengthening ribs at the bottom wall 36 and side walls 32 that face toward the open end of the head.

Figure 5:
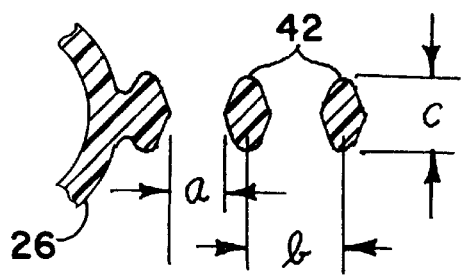
FIG. 5 is an approximately full size cross-section illustrating the dimensions and spacing between either the tines or between the sifting slots of walls of the fork of FIG. 4.

All of the tine portion 28, walls 32, 34 and 36 and strengthening ribs 38 preferably have a diamond-shaped cross section 42 as shown in FIG. 5. And, ideally, the height and width dimensions of the sections 42 and the spacing between them are preferably the same whether the section 42 represents tines or wall elements. Dimension "a" is preferably one fourth of an inch, but may vary according to what the owner of the horse is willing to tolerate in the size of manure pieces left behind after stall cleaning. The preferred dimensions of "b" and "c" are nine-sixteenths and seven-sixteenths of an inch, respectively. The width of each tine is five-sixteenths of an inch. The strengthening ribs 38 are preferably of the same height and width as the tines. The free ends of the tines are slightly blunt-pointed. The fork is used in the common fashion of a manure fork except that after lifting manure from the particles or sawdust, the fork 20 is shaken up and down sufficiently to cause loose particles or sawdust to break free of the manure and sift through the tines. Seldom will this action cause any horse to become skittish during cleaning the stall, as would be the case if a vibrating sifter were brought into and used in the stall. And, unlike a blunt-edged scoop shovel, the tines can pass freely beneath manure into pellets or sawdust. It is believed that the tine spacing mentioned above has resulted in a minimum bedding cost savings of 20% compared to what was previously possible with other forks. This is due in large measure to sifting out the smaller particles of manure, and thus reducing-bacteria retention and bedding discoloration.

The manufacture of the fork from polycarbonate material has resulted in a stronger plastic manure fork than any previously known. The head (without a handle attached) has been stood on by a two-hundred pound man while the head was upside down, and jumped on several times, without breakage. The tines were bent both up and down as far as they could be bent, approximately four inches, also without breakage. Such forks are ordinarily subjected to severe treatment by users, and thus far seem to be standing up well to ordinary wear and tear and other mistreatment.

The shape of the tines and the solid portions of the walls are such as to permit small particles to enter the widened throat at the top and work themselves toward the space "a" between the tines. Whether or not they pass through the fork depends on their size. If they do not, the fork is inverted to transfer any particles that can't pass through the tines or wall slots to be placed in a conventional muck bucket (not shown) along with manure. Whenever the sawdust granules clump together from heavy urination in one area, such clumps can be gently lifted without shaking or with only slightly shaking the fork, and removed prior to replacement by fresh particles 12.

Figure 6:
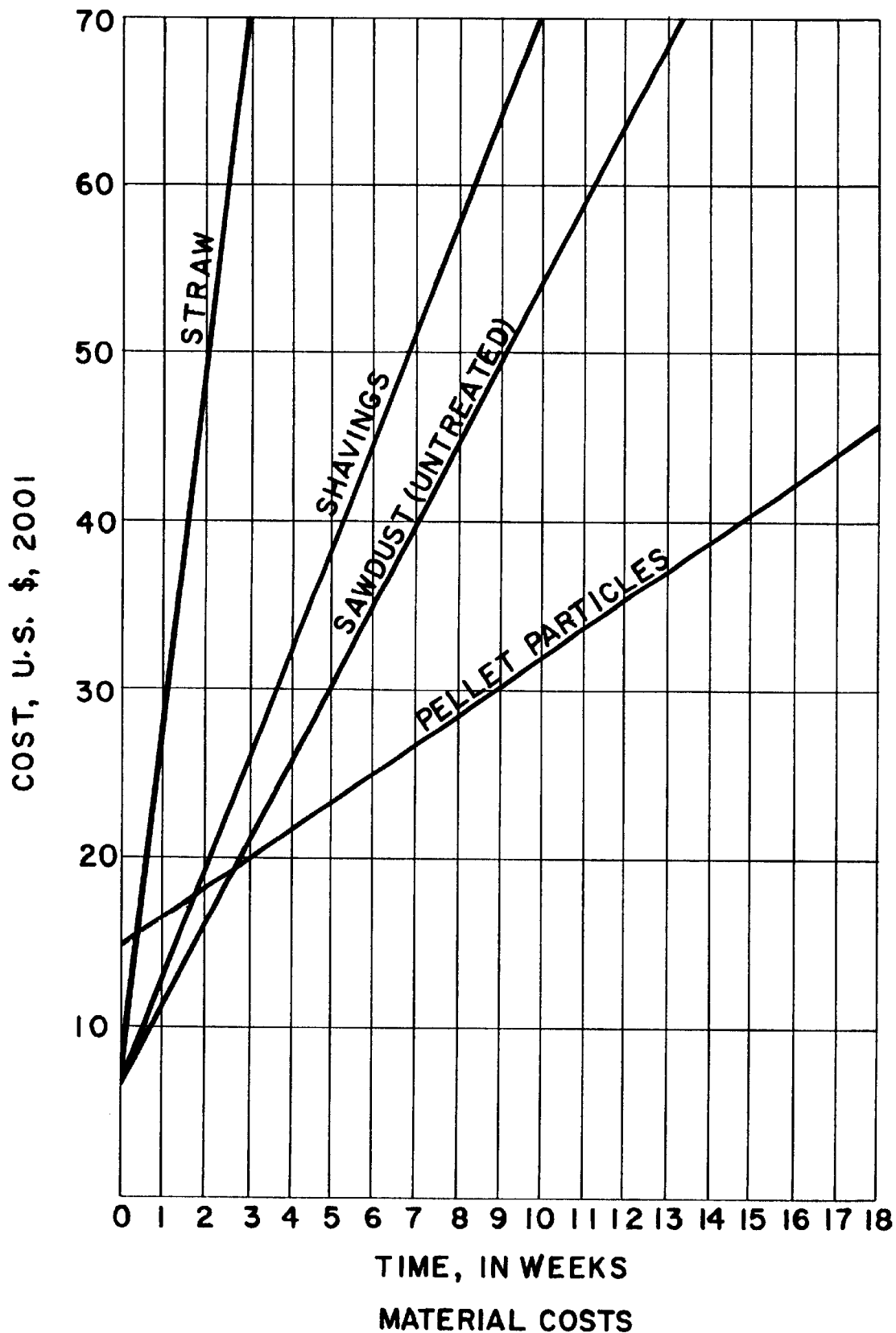
FIG. 6 is a chart showing the initial higher material cost of establishing a livestock bedding in comparison with its lower overall cost during the life of the bedding.

FIGS. 5 and 6 show material cost comparisons and labor cost comparisons of the four most common type of bedding in use today, respectively. As regards material costs, it can be noted that the original cost of pellets 10 or pellets particles 12 to establish a fresh bedding for a horse is more than twice that of straw, shavings or sawdust. But since the latter three materials must be completely stripped at least weekly, while the pellets need only be maintained without stripping for a considerable period of time, often many months, a break even point is reached at about the third week. After that, the dollar savings using the sterile pelletized sawdust can be as much as $250 to $500 per year per horse. In my operation where I typically have between 30 and 50 horses at any given time, this can result in a total materials cost savings of between $7,500 and $25,000 per year. Obviously, a lot depends on the many variables that go into operating any business of this type.

Figure 7:
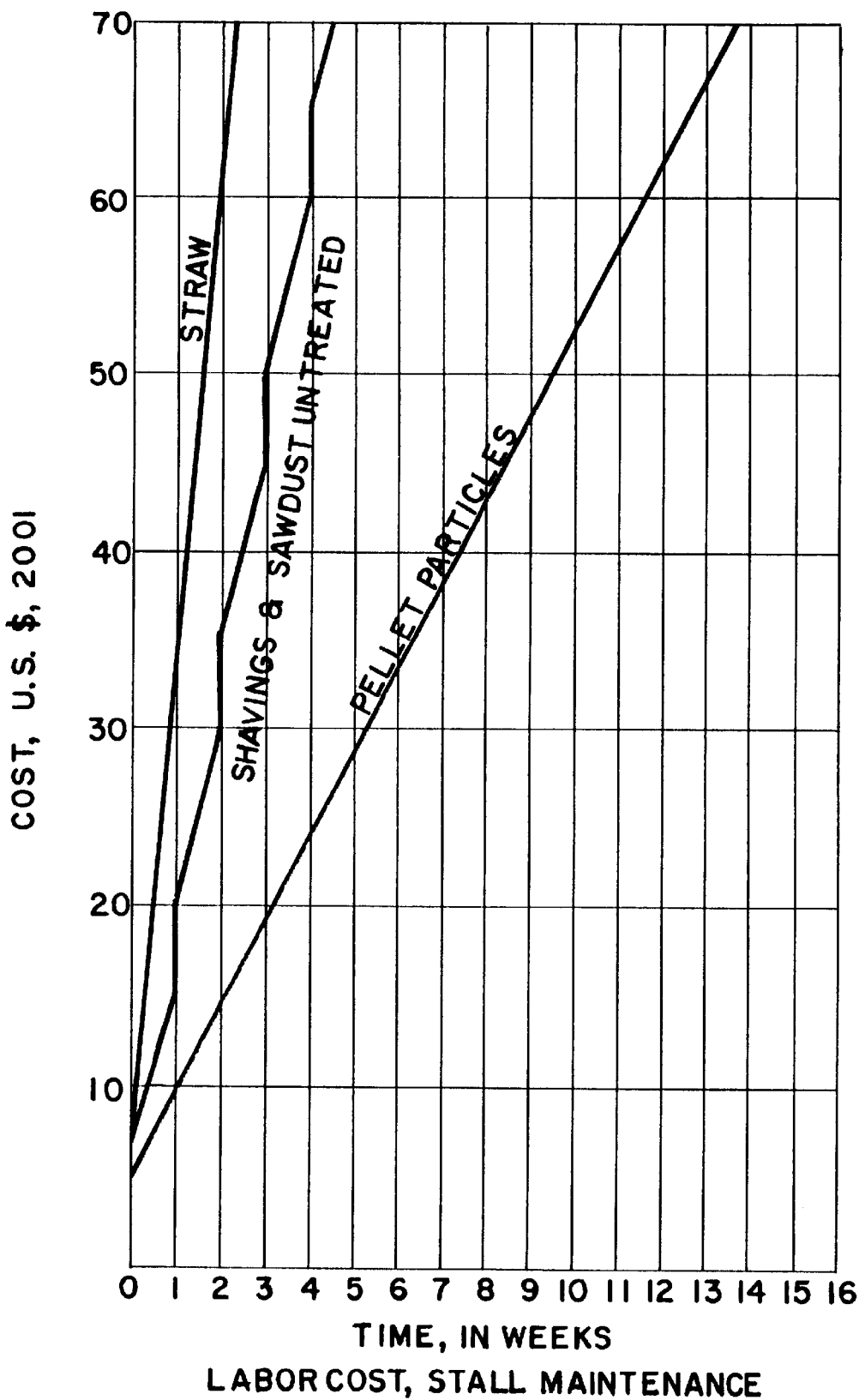
FIG. 7 is a chart illustrating the labor cost savings achieved through the use of the pelletized bedding of FIGS. 1 or 2 and a fork having the tine spacing of FIG. 4.

Labor savings is demonstrated in FIG. 7 separately from the materials cost savings aspect of FIG. 6, since it is dependent upon the labor rate in any given area at any given time and is therefore subject to wide differences depending on locality. At a rate of $10 per hour, for example, the labor saving time starts immediately and continues indefinitely until the stall is completely stripped. There is no need to daily wheel a wheelbarrow into the stall to collect straw with the manure, nor any need to remove a horse from the stall and place it elsewhere if a sifting machine is to be used for sawdust or shavings. In terms of replenishing the bedding with fresh pellets 10 or pellet particles 12, this needs to be done only infrequently. Ordinarily, one bag is added at the end of the second week, and an additional half-bag is added weekly thereafter. What makes this possible is the ability of the fork of FIG. 4 to remove all but the tiniest of manure particles. While there is some slight discoloration of the sawdust as the bedding ages, surprisingly, the sterility of the pelletized sawdust is such that the smell of urine or manure is unnoticeable for the most part. Odor-causing bacteria have difficulty growing in this product. Labor cost when using the fork of this application in conjunction with the pellets 10 or particles 12 is estimated to be about one-half that of straw and about one-third that for shavings or plain sawdust.

Obviously, many variables enter into the total picture according to the procedures, materials and material or labor costs in any given locality. These cannot be actually represented here, and thus have been estimated only. In addition, the specific construction of and material for the fork can be varied. Furthermore, although the fork appears to work best to provide the cleanest bedding over time with the pellet particles 12 of FIG. 2, it can work quite suitably with the pellet material 10 that is already on the market. And its use can result in savings with both plain untreated sawdust and wood shavings, since the more manure that can be removed during stall cleaning, the greater the potential for longer-lasting bedding. To the extent that the special fork with the particular tine spacing is used in conjunction with either pellets 10 or pellet particles 12, it is intended that method claims reading on both cover use with either.

Various other changes may be made without departing from the spirit and scope of the claims.

Having described my invention, I claim:

1. The method of removing manure from loose particulate livestock bedding material while minimizing loss of the bedding material with the removed manure, comprising the steps of:

a. providing a bedding of pelletized particulate material in a stall to a depth approximating between one and four inches so as to enable livestock to lie and rest comfortably thereon, said bedding consisting of sterile compacted sawdust pelletized material which is sufficiently dense and absorbent so as to enable excreted manure to be supported primarily atop the bedding and urine to be absorbed by the bedding, individual pieces of said pelletized material being of a size smaller than the manure excreted by bedded livestock;

b. providing a pellet fork having essentially parallel tines each of which is spaced from adjacent tines of said fork a distance nominally exceeding at least one dimension of said pieces whereby the pieces can pass essentially freely through spaces between the tines;

c. projecting the tines of said fork generally horizontally into and through said bedding below manure to be removed therefrom;

d. lifting said fork vertically to support the manure atop said tines while allowing underlying pelletized material tending to loosely cling to the manure to pass through said spaces between adjacent tines and return to said bedding; and e. extracting a maximum volume of material from said fork by manually shaking the fork while supporting lifted material and manure thereon to sift pelletized material pieces from the manure and permit their return to the bedding.

2. The method according to claim 1 wherein said material consists of pellet particles that are capable of relatively interlocking and are uniformly-sized of approximately one-fourth inch or less when originally provided in said bedding, wherein said pellet particles become reduced to sawdust as they absorb urine or are trampled by the animal, and wherein the spaces between the tines of said fork are slightly in excess of one-fourth of an inch.

3. The method according to claim 2 wherein said pellet particles are originally cylindrically extruded in a diameter of one-fourth of an inch and in lengths exceeding one-fourth of an inch from sterile sawdust under high pressure, and are subsequently converted sufficiently to produce them in lengths generally not exceeding their diameters.

4. The method according to claim 3 wherein pellet particles are generally uniformly sized of approximately one-fourth of an inch.

5. The method according to claim 1 wherein said material, upon absorption of urine, expands at least three to four times in volume, said method further including the additional steps of maintaining said bedding for a prolonged period by:

periodically removing wet urine-soaked clumps of said bedding with said fork but without shaking thereof;

replacing removed bedding material with fresh pelletized material; and intermixing the freshly added material with existing expanded bedding to obtain a bedding of a relatively uniform moisture content.

6. The method according to claim 5 wherein said bedding is maintained by removal of clumped sawdust and is freshened with added pelletized material for a period in excess of a month before stripping the entire bedding from the stall and starting a new bedding.

7. A manure fork for practicing the method of claim 1 wherein all of said tines are spaced apart on the order of approximately one-fourth to seven-sixteenths of an inch and are at least six inches in length.

8. A manure fork for removing manure from animal bedding that consists of discrete particles having a maximum dimension of one-half inch, said fork having a head consisting of a tine portion with cantilevered tines pointing toward an open end thereof, a sifting portion including said tine portion and a second portion at the end of said head opposite the open end and a handle extending outwardly from the sifting portion in a direction generally opposite the open end for enabling the tine portion to be manually inserted into and through the animal bedding below manure to be removed therefrom, said second portion having a bottom wall, a pair of opposed side walls and a rear wall, each of which walls has a plurality of parallel slots therein, the improvement comprising;

the tines of said tine portion being spaced apart a distance nominally exceeding at least one dimension of said particles, and said wall slots being generally equal in width to the spacing between adjacent tines, whereby, when removing manure from said bedding, particles may be freely sifted through the spaces and slots while maintaining manure atop said tines and walls.

9. A manure fork according to claim 8 wherein said tine spacing and slot widths are approximately on the order of one-fourth to seven-sixteenths of an inch.

10. A manure fork according to claim 9 wherein said discrete particles are originally manufactured as cylindrical extruded and compacted sawdust with each individual particle having a diameter of approximately one-fourth of an inch and a length generally not exceeding said diameter.

11. A manure fork according to claim 8 wherein the cross-sectional width of each of said tines and the solid portions of said walls between adjacent slots does not exceed one-half of an inch.

12. A manure fork according to claim 11 wherein the width of each of said tines and said solid portions is approximately one-fourth of an inch.

13. A manure fork according to claim 8 wherein said head is molded from a unitary piece of polycarbonate plastic material.

14. A manure fork according to claim 13 wherein a strengthening rib surrounds the periphery of each of said bottom, side and rear walls, with adjoining walls sharing a common strengthening rib.

15. A manure fork according to claim 14 wherein the tines are integrally supported in cantilever fashion at the edges of the strengthening ribs on said bottom wall and side walls nearest the open end of said head.

* * * * *